(12) United States Patent
Fisher, Jr.

(10) Patent No.: US 9,257,783 B2
(45) Date of Patent: Feb. 9, 2016

(54) HERMETIC CABLE ADAPTER

(71) Applicant: MegaPhase, LLC, Stroudsburg, PA (US)

(72) Inventor: Robert L. Fisher, Jr., East Stroudsburg, PA (US)

(73) Assignee: MegaPhase, LLC, Stroudsburg, PA (US)

( * ) Notice: Subject to any disclaimer, the term of this patent is extended or adjusted under 35 U.S.C. 154(b) by 0 days.

(21) Appl. No.: 14/462,805

(22) Filed: Aug. 19, 2014

(65) Prior Publication Data

US 2014/0357107 A1    Dec. 4, 2014

Related U.S. Application Data

(63) Continuation of application No. 13/757,453, filed on Feb. 1, 2013, now Pat. No. 8,840,413.

(60) Provisional application No. 61/594,844, filed on Feb. 3, 2012.

(51) Int. Cl.
*H01R 13/52*     (2006.01)
*H02G 15/04*     (2006.01)
*H01R 24/54*     (2011.01)
*H01R 103/00*    (2006.01)

(52) U.S. Cl.
CPC .......... *H01R 13/5221* (2013.01); *H01R 13/521* (2013.01); *H01R 24/542* (2013.01); *H02G 15/04* (2013.01); *H01R 2103/00* (2013.01)

(58) Field of Classification Search
CPC ............... H01R 13/521; H01R 24/542; H01R 13/5221; H01R 2103/00; H02G 15/04
USPC ......................................................... 439/275
See application file for complete search history.

(56) References Cited

U.S. PATENT DOCUMENTS

| | | | |
|---|---|---|---|
| 5,885,114 A * | 3/1999 | Akeda et al. ................... | 439/752 |
| 7,641,494 B2 | 1/2010 | Chen et al. | |
| 7,828,596 B2 | 11/2010 | Malak | |
| 8,007,302 B2 | 8/2011 | Kleinke | |
| 8,317,531 B2 | 11/2012 | Kleinke | |
| 8,840,413 B2 * | 9/2014 | Fisher, Jr. ..................... | 439/275 |
| 2012/0094518 A1 | 4/2012 | Mathews | |
| 2013/0102176 A1 | 4/2013 | Kazubowski | |
| 2013/0273761 A1 | 10/2013 | Ehret et al. | |
| 2013/0273762 A1 | 10/2013 | Natoli | |

\* cited by examiner

*Primary Examiner* — Jean F Duverne
(74) *Attorney, Agent, or Firm* — Chadbourne & Parke LLP; Neal J. McLaughlin (57) ABSTRACT

A hermetic adapter includes an adapter body, a hermetic seal disposed between the adapter body and a pin, a contact connected to the pin which is disposed within a dielectric, the dielectric being disposed within the adapter body. A sealing ring is press-fit into the adapter body and includes a sharp edge configured to deform a surface of an external adapter to which the hermetic adapter is attachable.

10 Claims, 12 Drawing Sheets

HERMETIC CABLE ADAPTER

CROSS-REFERENCE TO RELATED APPLICATION

This application is a continuation of U.S. patent application Ser. No. 13/757,453, filed Feb. 1, 2013, which claims the benefit of U.S. Provisional Application No. 61/594,844, filed Feb. 3, 2012, each of which are hereby incorporated by reference in their entireties.

BACKGROUND

Hermetically sealed cables have been proposed for use in challenging environments in order to prevent intrusion of undesirable foreign matter, gasses, and/or liquids into a cable's interior or into an enclosure to which a cable connects. Such intrusion, if not prevented, may cause premature degradation or failure of a cable or components within an enclosure.

Conventional hermetically sealed cables typically include a connector permanently attached at either end of a cable having an outer sealed sheath enclosing one or more inner conductors. The end connectors are typically permanently attached to the cable by known hermetic sealing methods. However, such conventional cables require that the cable's function as a hermetically sealed cable be known at the time of manufacture. As a result, such conventional cables are typically manufactured to order, increasing manufacturing costs and limiting availability.

SUMMARY

This invention relates to hermetic adapters for applying a hermetic seal to an end of a cable and/or an enclosure-to-cable interface.

In general, in one aspect, the invention features a hermetic adapter which includes an adapter body including a sealing element cavity, a dielectric cavity and a sealing ring cavity, a pin having an outside surface, and a sealing element disposed between the outside surface of the pin and the sealing element cavity of the adapter body, the sealing element and the pin having substantially corresponding thermal expansion properties such that hermetic seals between the adapter body and the sealing element and between the sealing element and the pin are achievable. The hermetic adapter further includes a dielectric disposed at least partially within the dielectric cavity of the adapter body, the dielectric including a contact cavity, a contact disposed at least partially within the contact cavity of the dielectric, the contact forming an electrical connection with the pin and having an attachment opposite the electrical connection with the pin for attaching to an external adapter. The hermetic adapter further includes a sealing ring disposed at least partially within the sealing ring cavity of the adapter body, the sealing ring including a raised outer surface on an outer surface thereof configured to provide a press fit between the sealing ring and the sealing ring cavity of the adapter body to provide a hermetic seal between the sealing ring and the adapter body, and the sealing ring further including a sharp edge configured to deform a surface of the external adapter to provide a hermetic seal between the external adapter and the sealing ring.

Implementations of the invention may include one or more of the following features. The sealing ring may contact the dielectric. The dielectric may be deformed by the sealing ring. The dielectric may be disposed between and contact both sealing ring and the adapter body.

The adapter body may include female threading at a cable end thereof and includes male threading at an opposite end thereof opposite the cable end, the sealing element being nearer the opposite end than the cable end and the female threading may have a diameter that is larger than a diameter of the male threading or the female threading and the male threading may have diameters that are substantially similar.

The contact may include a female socket configured to conductively engage the pin. The contact may also include a female socket configured to conductively engage a conductor of a cable. The contact may have an outer surface with a barb thereon which deforms and engages the dielectric. The barb of the contact may include a barb surface substantially perpendicular to an axis of the contact, the barb surface facing away from the sealing element.

The hermetic adapter may further comprise a pin cap conductively attached to the pin opposite the contact.

The sealing ring may have a cable end surface, an opposite end surface opposite the cable end surface, the outer surface of the sealing ring may lie between the cable end surface and the opposite end surface thereof, and the raised outer surface of the sealing ring may be provided about less than all of the outer surface of the sealing ring. The raised outer surface of the sealing ring may also be provided about the outer surface nearer the cable end surface thereof than the opposite end surface thereof.

The sealing element may comprise a glass material and may be first installed between the adapter body and the pin in a molten state and may solidify to form the sealing element.

In general, in another aspect, the invention features a hermetically sealed cable assembly including a cable, a first cable adapter attached to a first end of the cable, a second cable adapter attached to a second end of the cable, a first hermetic adapter engaging the first cable adapter as an external adapter and a second hermetic adapter engaging the second cable adapter as an external adapter, such that an interior of the cable is hermetically sealed between the first hermetic adapter and the second hermetic adapter.

BRIEF DESCRIPTION OF THE DRAWINGS

The above mentioned and other aspects, features and advantages can be more readily understood from the following detailed description with reference to the accompanying drawings, wherein.

DETAILED DESCRIPTION

Cable adapters and connectors are described herein, with reference to examples and exemplary embodiments. Specific terminology is employed in describing examples and exemplary embodiments. However, the disclosure of this patent specification is not intended to be limited to the specific terminology so selected and it is to be understood that each specific element includes all technical equivalents that operate in a similar manner. Similarly, while some examples discussed herein concern coaxial cables, adapters and connectors, the present disclosure also relates to cables, adapters and connectors which are not coaxial, such as, for example, multi-conductor cables, adapters and connectors.

Figure 1:
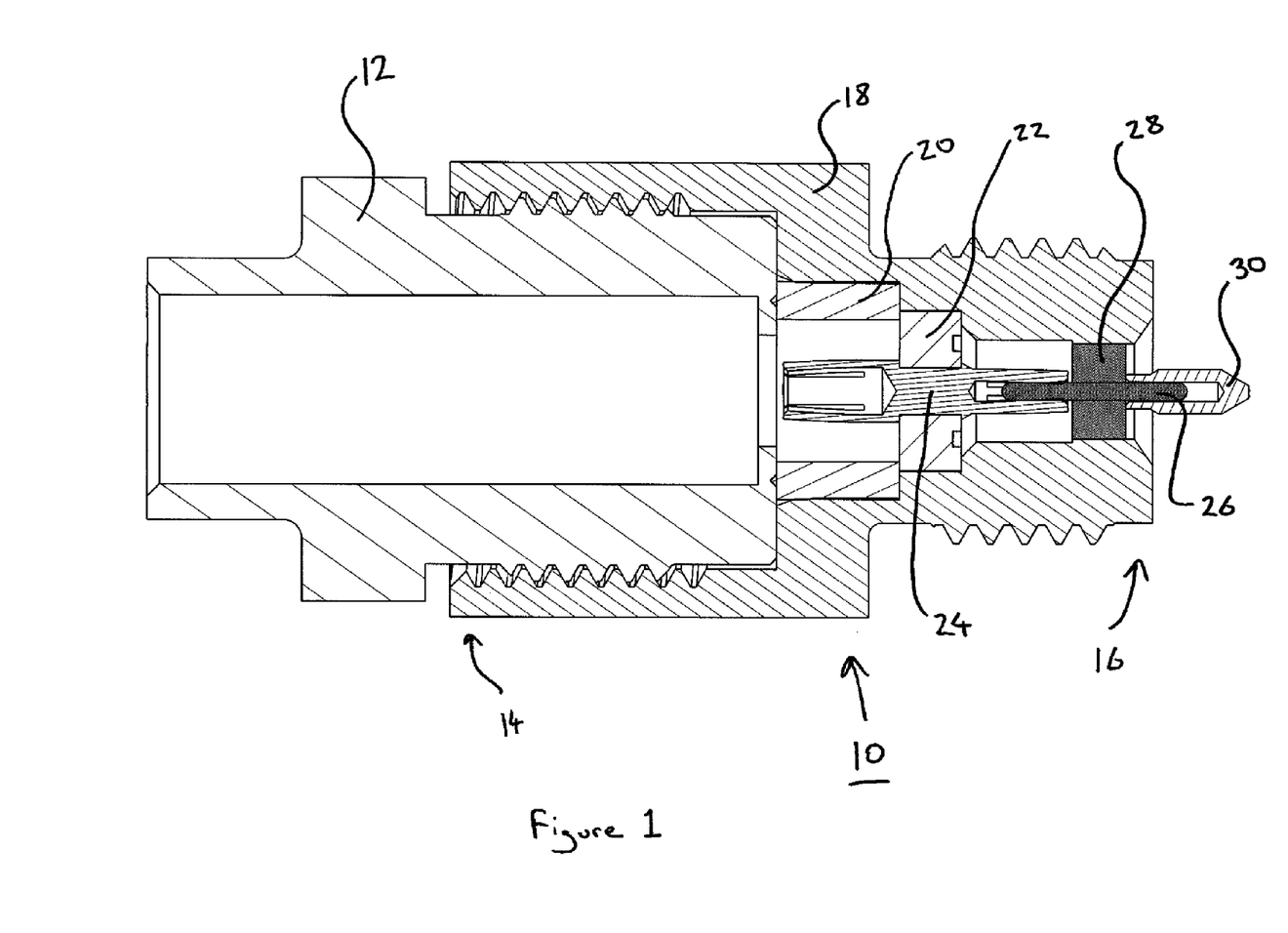
FIG. 1 is a cross sectional view of a hermetic adapter and cable adapter according to an exemplary embodiment of the present invention.

In an exemplary embodiment, shown in FIG. 1, a hermetic adapter 10 is shown adjacent a cable adapter 12. The hermetic adapter 10 is provided with a cable end 14 and a connector end 16. The cable adapter 12 may be fixed to a cable, as will be described in more detail below. The hermetic adapter 10 connects to the cable adapter 12 or another connector at the cable end 14 and provides a connection to an external connector at connector end 16. The external connector may be another cable adapter, an inlet to a device enclosure, another adapter, etc.

Figure 11:
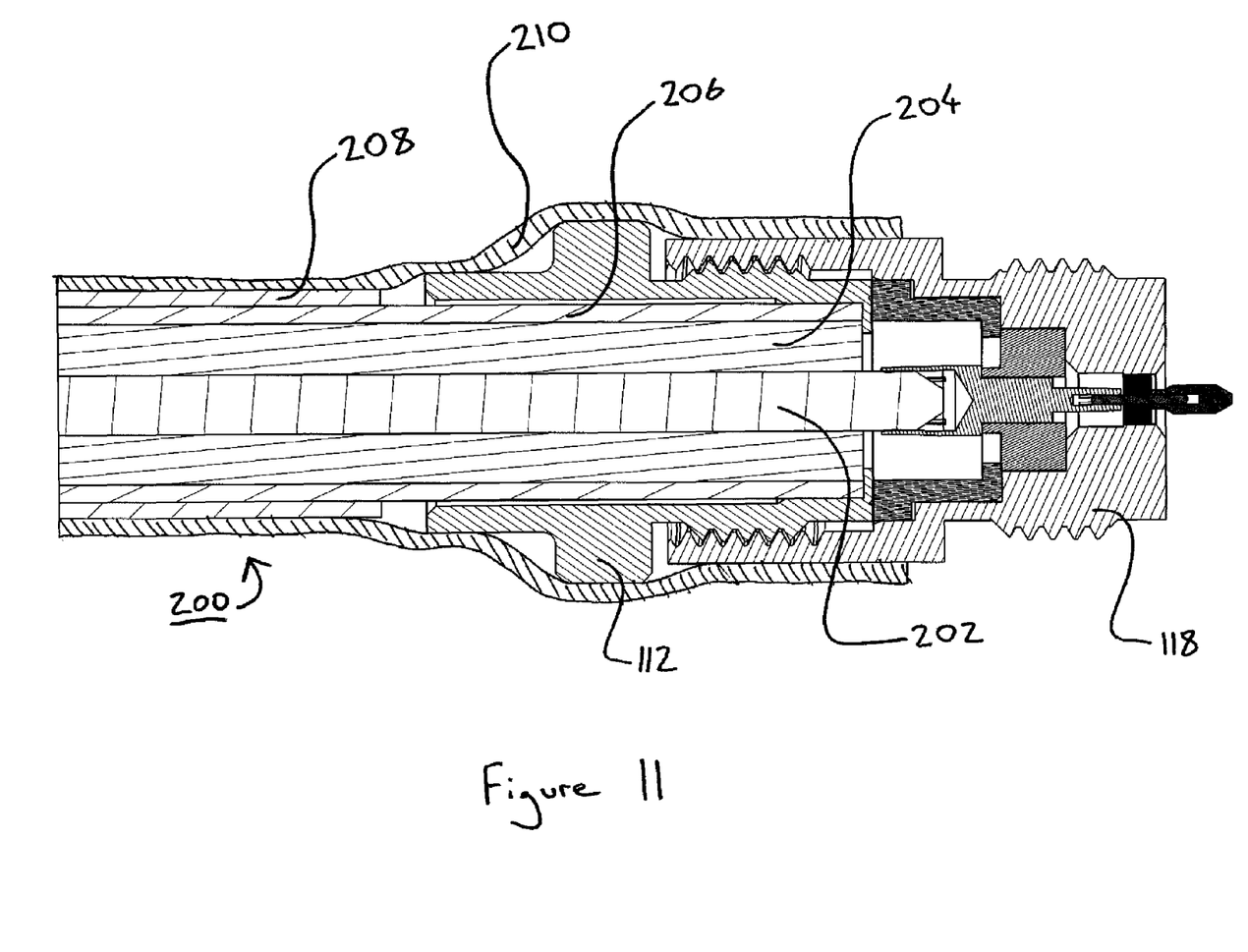
FIG. 11 is a cross sectional view of a hermetic adapter, cable adapter and cable according to another exemplary embodiment of the present invention.

An example of a cable 200 and cable adapter 12 is shown in FIG. 11. As shown, a cable may include an inner conductor 202, a dielectric 204, a shield 206 and a jacket 208. Any compatible means, of which there are many known in the art, may be employed to secure the cable and its constituent components to the cable adapter 12. As an example, the shield 206 may be soldered or crimped within the cable adapter 12. In addition, one or more strain relief components 210 may be provided over the jacket 208 and optionally over the cable adapter 112 and adapter body 118.

Figure 2:
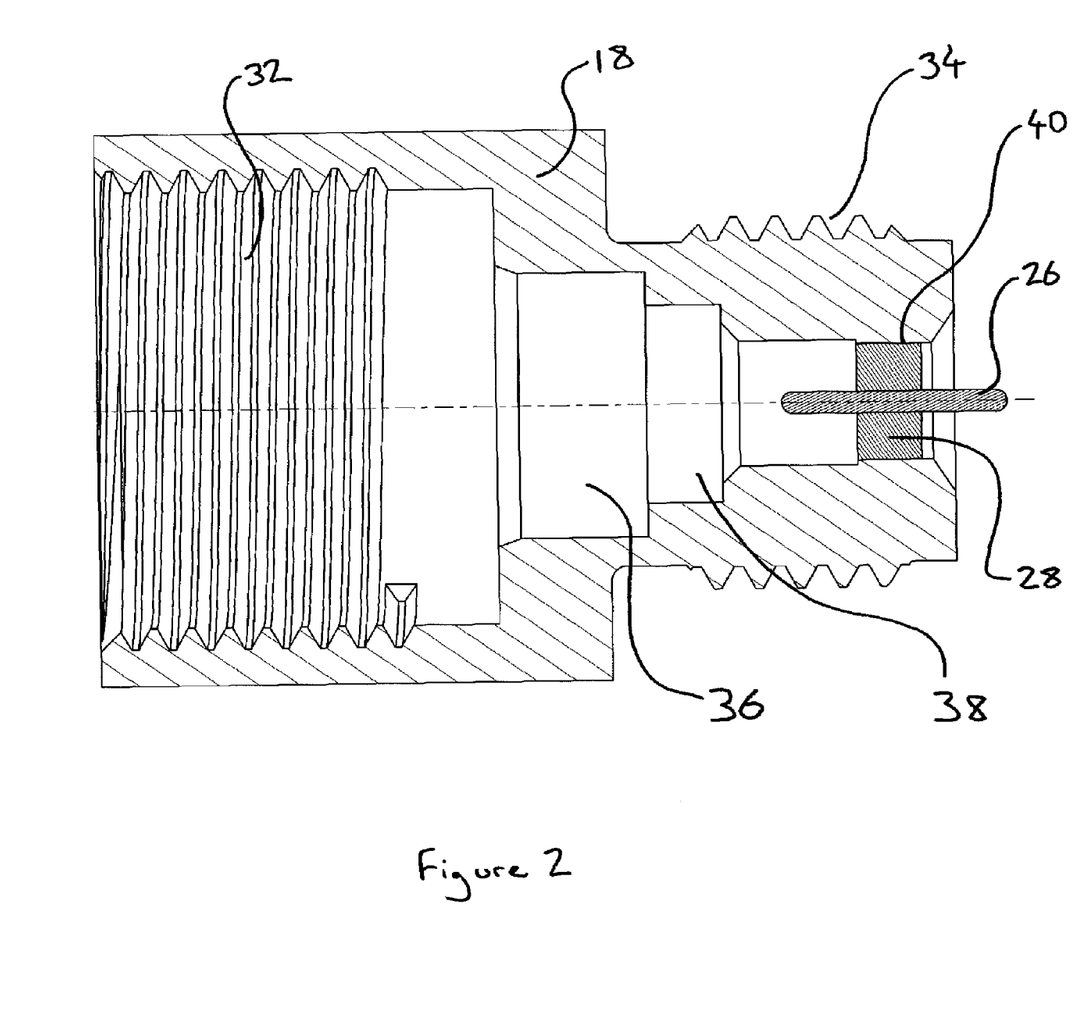
FIG. 2 is a cross sectional view of a hermetic adapter according to another exemplary embodiment of the present invention.
Figure 3A:
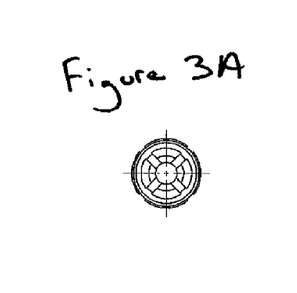
FIGS. 3A, 3B, 3C and 3D are left side, front side cross sectional, right side and front side views of a contact according to another exemplary embodiment of the present invention.
Figure 3B:
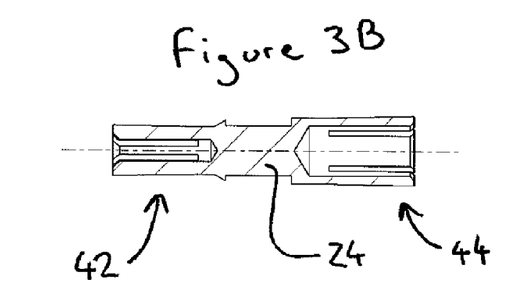
Figure 3C:
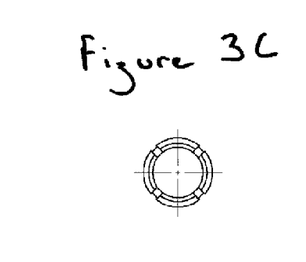
Figure 3D:
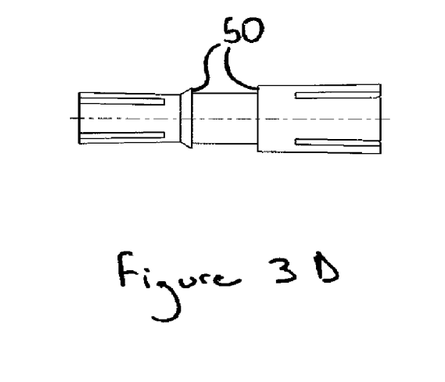
Figure 3E:
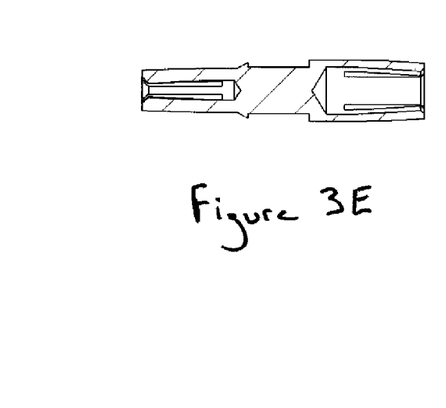
FIG. 3E is a front side cross sectional view of a contact after compression according to another exemplary embodiment of the present invention.

In the examples shown in FIGS. 1 and 2, the hermetic adapter 10 includes several components, including adapter body 18, sealing ring 20, dielectric 22, contact 24, pin 26, sealing element 28 and pin cap 30. The adapter body 18 may be provided with a female thread 32, a male thread 34, a sealing ring cavity 36, a dielectric cavity 38 and a seal cavity 40. An example of an adapter body 18, sealing element 28 and pin are shown in greater detail in FIG. 2. In one example, the sealing element 28 may be formed of thermal expansion matching glass, such as Corning 7070 Lithia Potash Borosilicate Glass or an equivalent. In one example, the pin 26 may be formed of a metal alloy configured to be compatible with the thermal expansion characteristics of the sealing element 28. In one example, the pin 26 may be formed of a nickel-cobalt ferrous alloy such as KOVAR (a trademark of Carpenter Technology Corporation). In one example, the adapter subassembly shown in FIG. 2 may be assembled by aligning the pin 26 to the adapter body 18 and introducing molten glass into a mold having a cavity configured to form the sealing element 28 in the position desired once the molten glass is solidified. Thus, the alignment between the pin 26 and the adapter body 18 may be fixed by the sealing element 28 as the sealing element 28 hardens. Once the sealing element 28 is solidified, a hermetic seal is formed between the adapter body 18 and the sealing element 28 and between the seal and the pin 26.

Figure 4A:
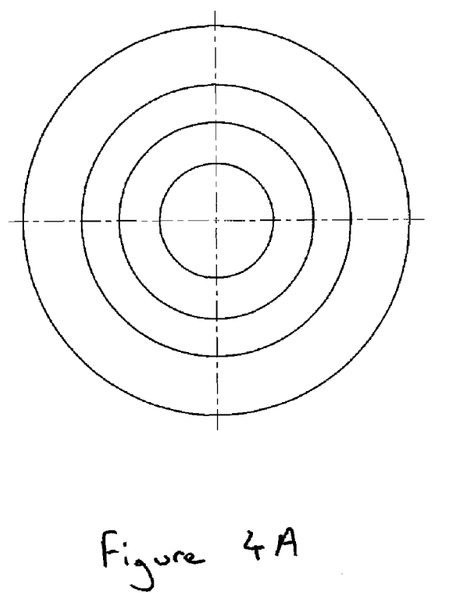
FIGS. 4A and 4B are left side and front side cross sectional views of a dielectric according to another exemplary embodiment of the present invention.
Figure 4B:
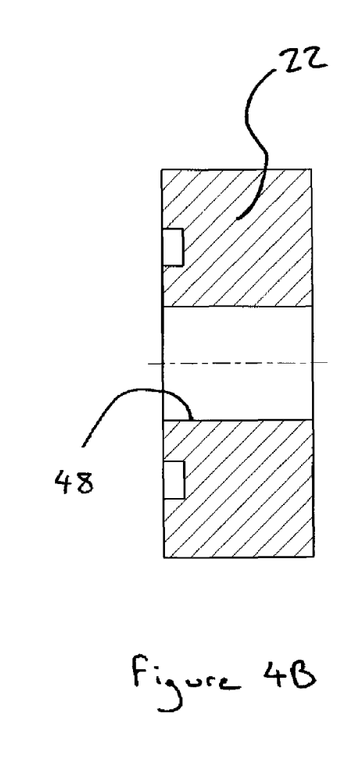

An example of a contact 24 is shown in FIGS. 3A-3E. Contact 24 may include two female connector ends, a pin end 42 and a cable end 44. The female connector ends may be configured to attach to male pins or conductors of the same or different diameters or shapes. For example, as shown in FIGS. 1 and 3A-3E, contact 24 may be configured to connect at its pin end 42 to a pin 26 having a smaller diameter than a cable conductor (not shown) to which the contact 24 is configured to attach at its cable end 44. The female ends 42 and 44 of the contact 24 may be provided with one or more slots configured to provide a desired insertion or withdrawal force to or from the male pin or cable conductor to which they are configured to attach. Slots may also be configured to improve an electrical connection between the contact 24 and a pin or cable conductor. The contact 24 may be inserted into an inner bore 48 of the dielectric 22. An example of a dielectric 22 is shown in greater detail in FIGS. 4A and 4B. The contact 24 may be provided with one or more lips 50 configured to engage surfaces of the dielectric 22 to mechanically hold the contact 24 and dielectric 22 together. During assembly, the dielectric is slightly deformed as the contact 24 is forcibly inserted through the inner bore 48 of the dielectric 22 until the lips 50 of the contact 24 engage the appropriate surfaces of the dielectric. The dielectric may be provided within the dielectric cavity 38 of the adapter body 18.

Figure 5:
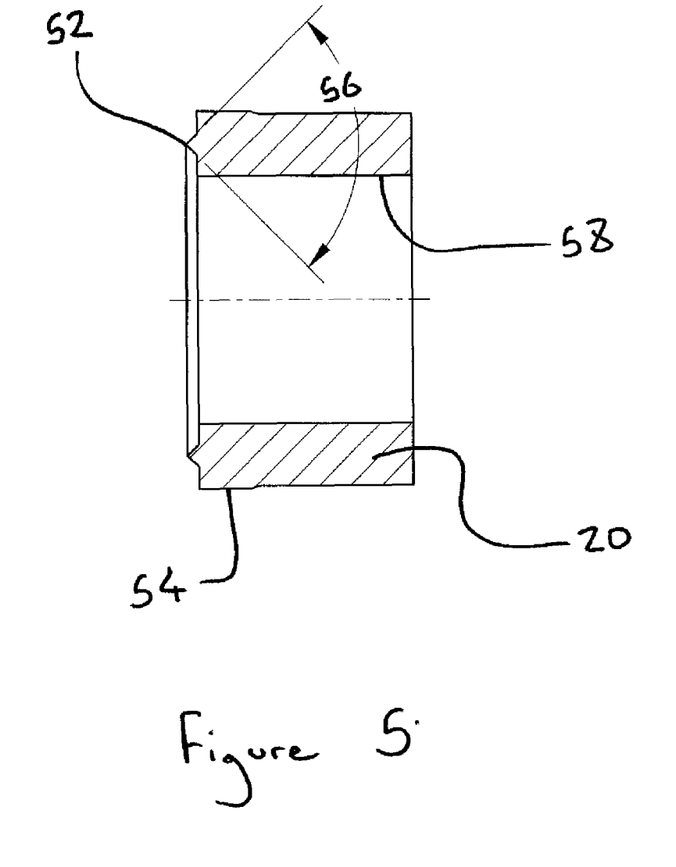
FIG. 5 is a front side cross sectional view of a sealing ring according to another exemplary embodiment of the present invention.

An example of a sealing ring 20 is shown in FIG. 5. Sealing ring 20 may include a sharp edge 52 and an outer raised surface 54. As shown in FIG. 1, the sharp edge 52 of the sealing ring may be oriented towards the cable end 14 of the hermetic adapter 10 when the sealing ring 20 is inserted into the adapter body 18. The sharp edge 52 is configured to deform a cable adapter 12 or other connector to which the hermetic adapter is attached, digging a trough into the attached adapter 12 or connector. In a preferred embodiment, a material of the sealing ring 20 is harder than a material of the cable adapter 12. In one example, the surfaces of the sharp edge 52 form an included angle 56 of substantially 90° when viewed in cross section. Other included angles 56 are also possible. The deformation of the adapter 12 or connector, combined with the forcible insertion of the sharp edge 52 into the trough thereby created form a hermetic seal between the sealing ring 20 and the attached adapter 12 or connector. The outer raised surface 54 of the sealing ring 20 may be provided anywhere along the outer surface of the sealing ring 20. In the example shown in FIG. 5, the outer raised surface 54 is provided at an end of the sealing ring towards the sharp edge 52. The outer raised surface 54 of the sealing ring has a slightly larger diameter than a diameter of the sealing ring cavity 36 into which the sealing ring 20 is installed, resulting in a press-fit between the sealing ring 20 and the adapter body 18. In one example, the sealing ring 20 may be installed into the adapter body 18 as far as it will go until a surface of the sealing ring 20 opposite the sharp edge 52 bottoms out against an adjacent surface of the sealing ring cavity 36 of the adapter body 18. Thus, the sealing ring 20 and the adapter body 18 may be press-fit together during assembly, forming a hermetic heal between the sealing ring 20 and the adapter body 18. When the outer raised surface 54 is provided towards the sharp edge 52 along the outer surface of the sealing ring 20, the hermetic seal between the adapter 12 and connector and the hermetic seal between the sealing ring 20 and the adapter body 18 are thus advantageously brought close to one another, possibly lessening the chance of thermal or other environmental effects causing a failure or reduction in effectiveness of either hermetic seal.

As shown in FIG. 1, the sealing ring 20 may be provided with an inner bore 58 having a smaller diameter than the outer surface of the dielectric 22. Thus, when the sealing ring is press-fit into the adapter body 18, the dielectric (and the contact 24 held therein) may be mechanically confined within the adapter body 18, as shown in FIG. 1.

The pin cap 30 may be attached to the pin 26 in any number of ways. For example, the pin cap 30 may be press-fit onto the pin 26 or the pin cap 30 may be soldered onto the pin 26.

Figure 6:
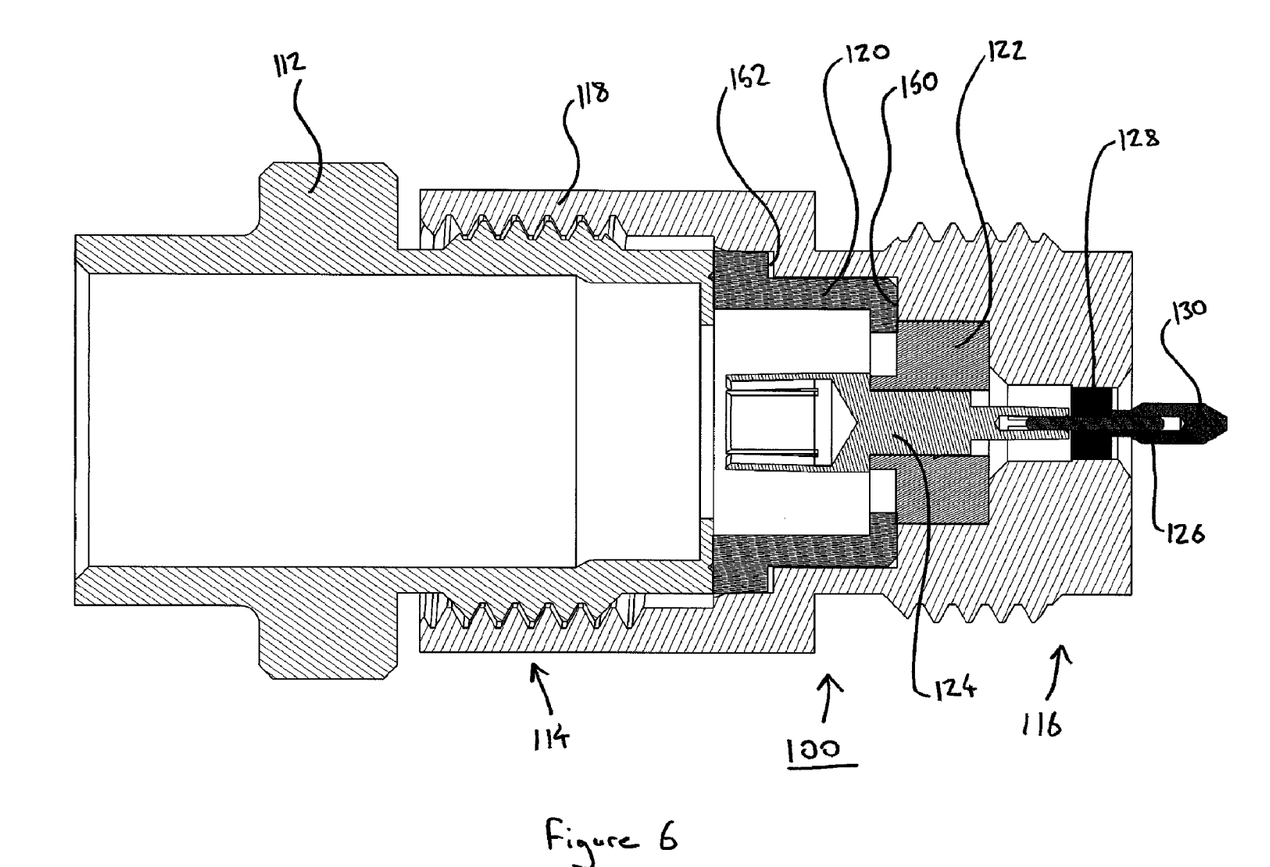
FIG. 6 is a cross sectional view of a hermetic adapter and cable adapter according to another exemplary embodiment of the present invention.
Figure 7A:
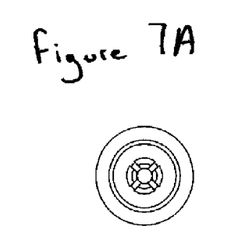
FIGS. 7A, 7B, 7C and 7D are left side, front side cross sectional, right side and front side views of a contact according to another exemplary embodiment of the present invention.
Figure 7B:
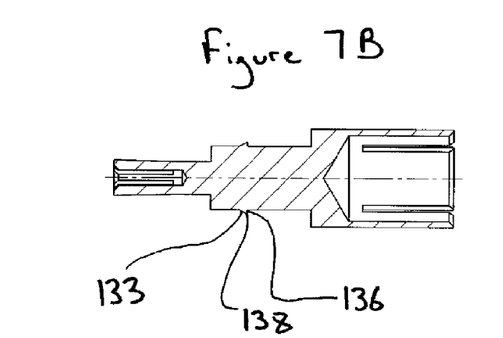
Figure 7C:
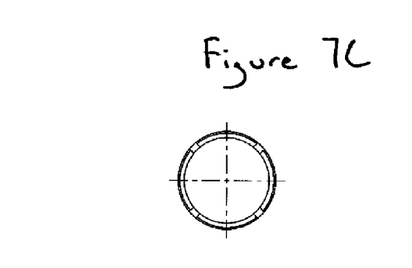
Figure 7D:
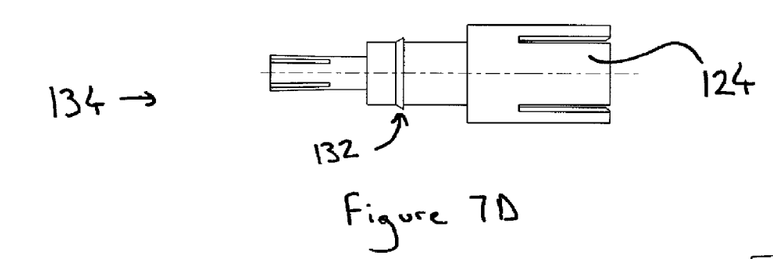
Figure 7E:
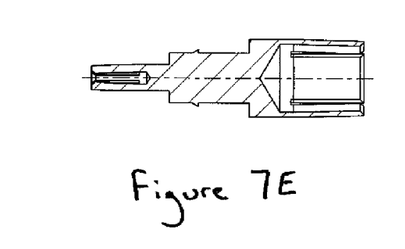
FIG. 7E is a front side cross sectional view of a contact after compression according to another exemplary embodiment of the present invention.
Figure 9:
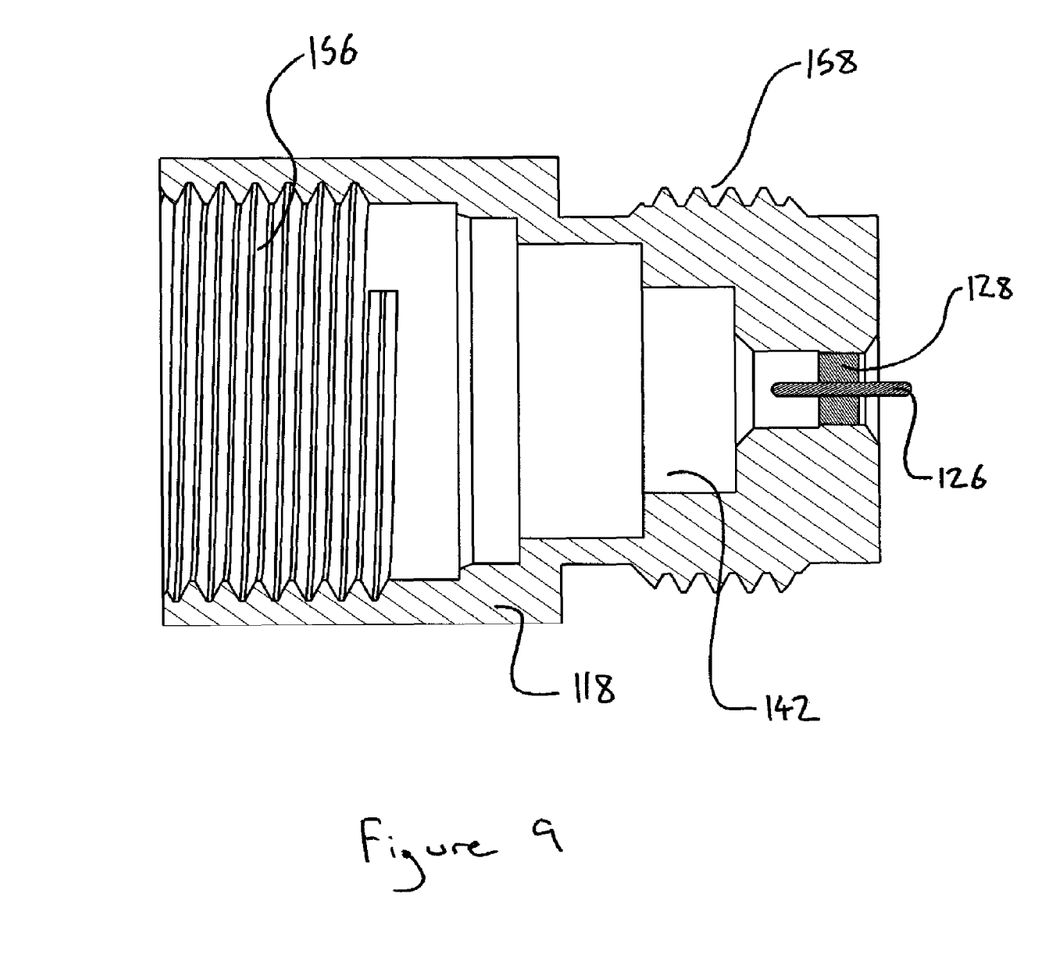
FIG. 9 is a cross sectional view of a hermetic adapter according to another exemplary embodiment of the present invention.

In another embodiment, shown in FIG. 6, a hermetic adapter 100 may include an adapter body 118, sealing ring 120, dielectric 122, contact 124, pin 126, seal 128 and pin cap 130. The adapter body 118, seal 128 and pin 126 may be assembled as described above with respect to FIG. 1. An example of an assembled subassembly including an adapter body 118, a seal 128 and a pin 126 is shown in FIG. 9.

Figure 8:
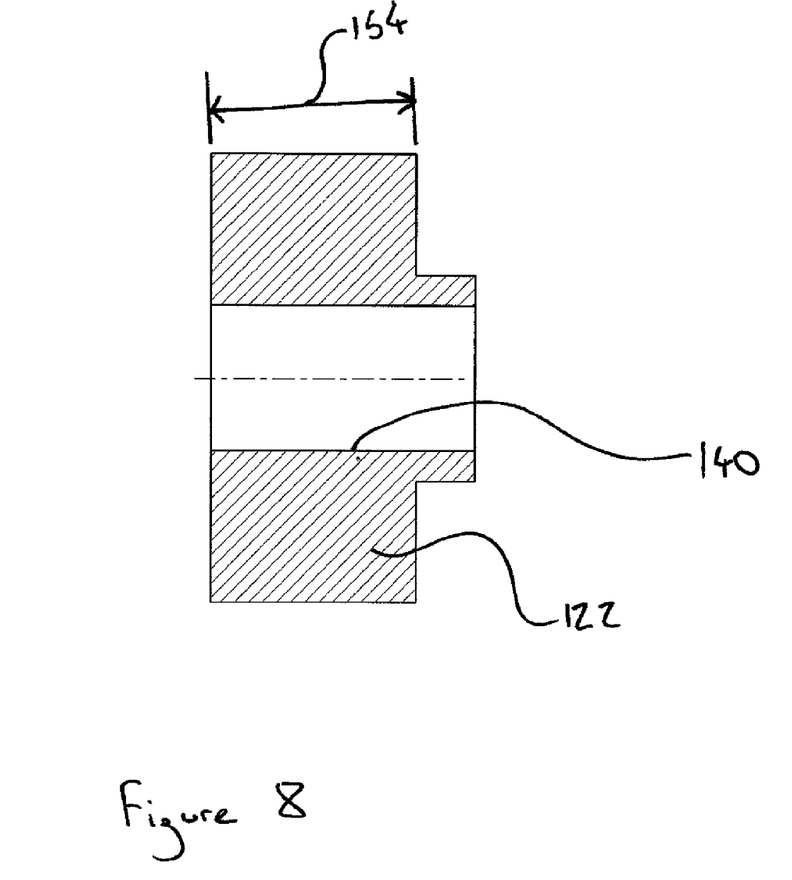
FIG. 8 is a front side cross sectional view of a dielectric according to another exemplary embodiment of the present invention.

In the example shown in FIG. 6, contact 124 is inserted into an inner bore of the dielectric 122. An example of a contact 124 is shown in greater detail in FIGS. 7A-7E, and an example of a dielectric 122 is shown in greater detail in FIG. 8. The contact 124 may include a barb 132 extending from an outer surface thereof. The barb 132 may be formed with an angled surface 133 facing a dielectric insertion direction 134 and a flat surface 136 adjacent the angled surface 133, defining a sharp edge 138 at the outermost portion of the barb 132. As shown in FIG. 6, a diameter of the sharp edge 138 of the barb 132 may be configured slightly larger than an inner bore 140 of the dielectric 122 shown in FIG. 8 so that the barb 132 digs into the dielectric 122 once the contact 124 and the dielectric 122 are assembled together. Thus, the contact 124 may be held captively within the dielectric 122.

Figure 10:
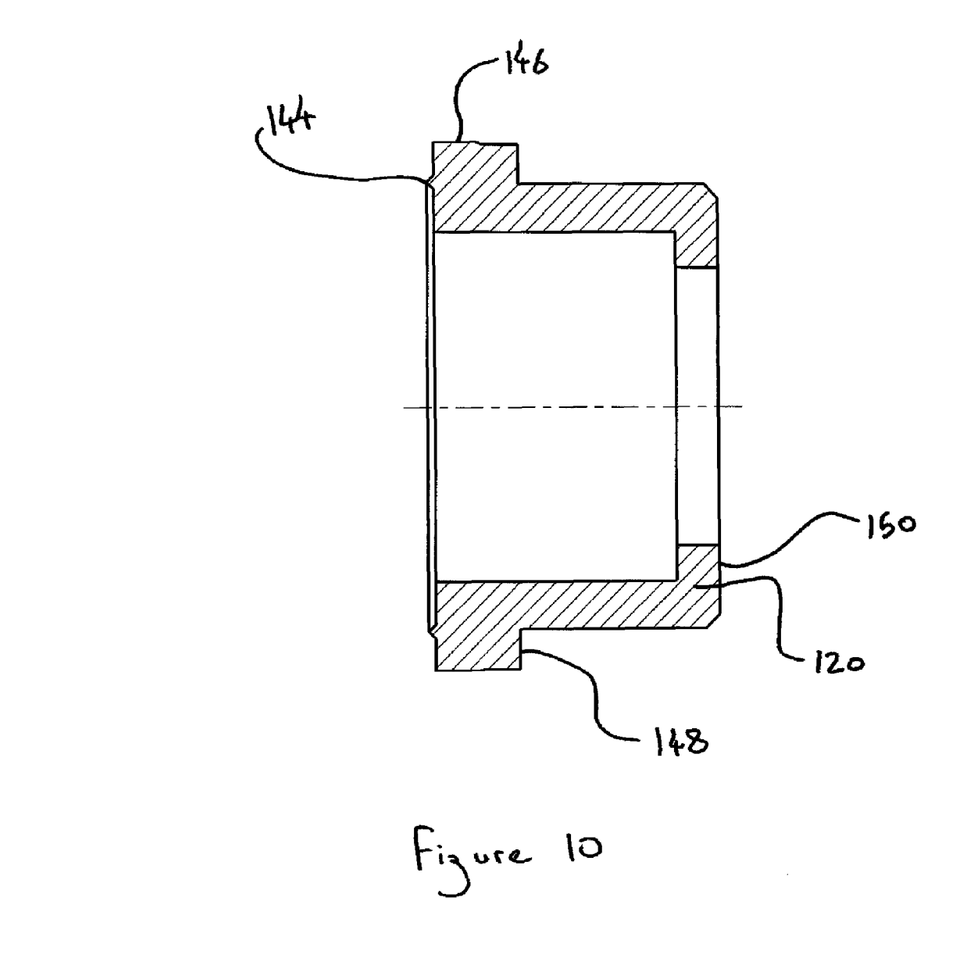
FIG. 10 is a front side cross sectional view of a sealing ring according to another exemplary embodiment of the present invention.

An example of a sealing ring 120 is shown in greater detail in FIG. 10. As in the example of sealing ring 20, shown in FIG. 5, sealing ring 120 may include a sharp edge 144 and a raised outer surface 146. Similarly, as with the example shown in FIG. 1, the sealing ring 120 may form a hermetic seal against an adjacent adapter 112 or connector by the sharp edge digging a trough into the adapter 112 or connector, and a hermetic seal may be formed between the raised outer portion 146 of the sealing ring 120 and the adapter body by virtue of a press-fit between the adapter body 118 and the sealing ring 120. In contrast to the example shown in FIG. 1, though, sealing ring 120 may comprise two or more surfaces opposite the end surface thereof containing the sharp edge 144. For example, as shown in FIG. 10, sealing ring 120 includes surfaces 148 and 150 which oppose the surface containing sharp edge 144. As shown in FIG. 6, the opposing surface 150 furthest from the sharp edge 144 may define a bottoming out point during assembly between the sealing ring 120 and the adapter body 118. A gap 152 may exist between intermediate opposing surface 148 and an adjacent surface of the adapter body 118. In one example, shown in FIG. 6, a length 154 of an outer surface of the dielectric 122 measured along the main axis of the dielectric 122 may be configured slightly larger than a corresponding depth of the dielectric cavity 142 of the adapter body 118 so that when the sealing ring 120 is inserted until its end surface 150 bottoms out against the adapter body 118, dielectric 122 contacts the sealing ring 120 and is slightly deformed or compressed as the sealing ring 120 is fully inserted. In other examples, the length 154 of the dielectric 122 or the corresponding depth of the dielectric 122 cavity 142 are configured so that no deformation or compression of the dielectric 122 occurs during insertion of the sealing ring 120 into the adapter body 118.

Materials for the various components may be chosen from among a wide range of suitable materials. In one example, adapter body 18 or 118 may be formed of passivated stainless steel, sealing ring may be formed of passivated stainless steel, contact 24 or 124 and pin cap 30 or 130 may be formed of gold plated beryllium-copper, dielectric 20 or 120 may be formed of PTFE (polytetrafluoroethylene, a brand of which is Teflon). Materials for the pin 26 or 126 and the sealing element 28 or 128 are discussed above.

In an aspect of the present disclosure, female threads (such as 32 or 156) and male threads (such as 34 or 158) of an adapter body 18 or 118 may be configured similarly or differently. For example, in the example shown in FIG. 2, male threads 34 and female threads 32 are differently configured. As one particular example, male threads 34 may be defined as ¼"-36, while female threads 32 may be defined as 5/16"-40. As another example, shown in FIG. 9, male threads 158 and female threads 156 may both be defined as 7/16"-28. In this example, a hermetic adapter 100, shown in FIG. 6, may be attached to a cable adapter 112 and other adapters may be attached at connector end 16 of the hermetic adapter 100 without concern for matching thread definitions. In other words, male threads 158 would have the same thread definition as the male threads of the cable adapter 112, and any connector originally intended for the attachment to the cable adapter 112 would also be configured to attach to the hermetic adapter 100.

In another aspect of the present disclosure, the dielectric 22 or 122 is captured (if not deformed or compressed into position) in the hermetic adapter 10 or 100 by a mechanical feature. For example, the dielectric 22 or 122 may be held against the adapter body 18 or 118 by an end surface of a sealing ring 20 or 120. In environments with large temperature or pressure swings, such mechanical capturing ensures that the dielectrics (which may be formed of a plastic such as PTFE) stay in place no matter the environment into which the adapter is placed, a particular concern of adapters of the type described herein.

Figure 12:
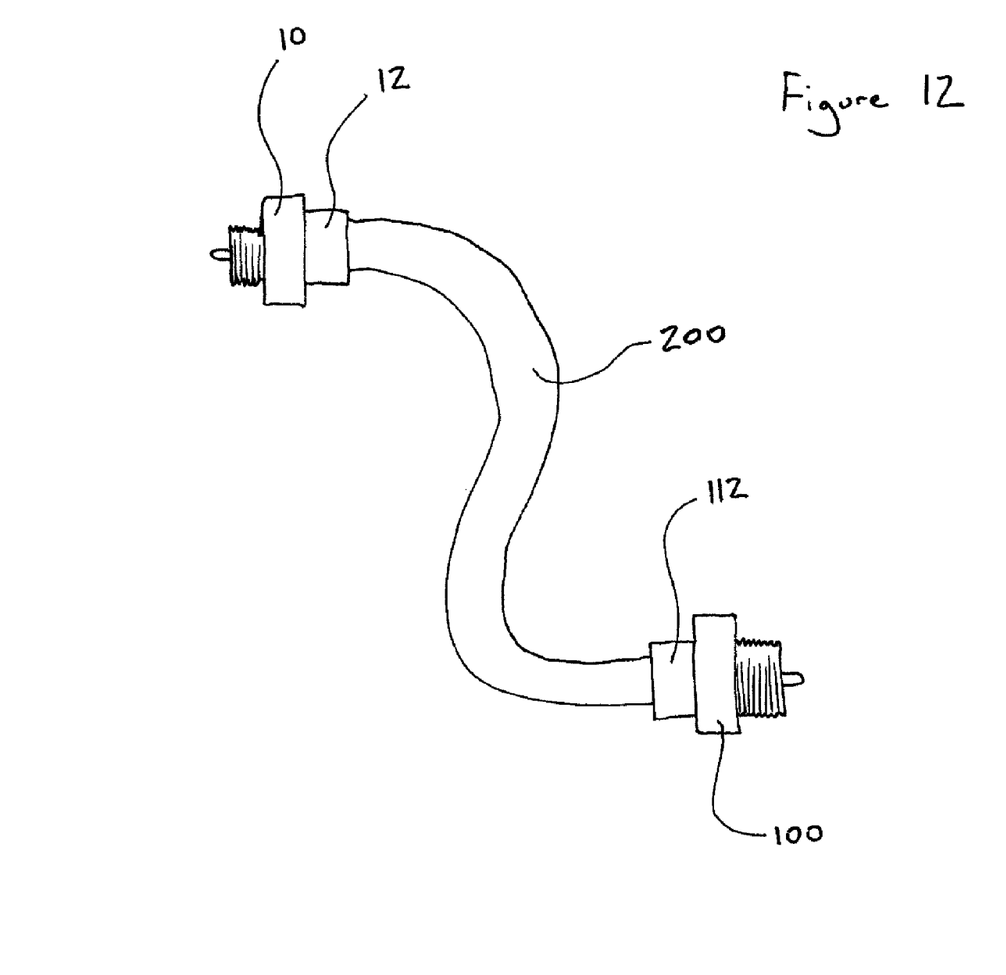
FIG. 12 is a notional view of a cable assembly according to another exemplary embodiment of the present invention.

In yet another aspect of the present disclosure, shown in FIG. 12, hermetic adapters 10 or 100 may be attached to one or more cable adapters 12 or 112, which may be attached to one or both ends of a cable 200 to render the cable assembly hermetically sealed. Thus, any conventional cable may be rendered hermetically sealed simply by attaching hermetic adapters 10 or 100 of the type disclosed herein to both ends thereof.

In addition, the embodiments and examples above are illustrative, and many variations can be introduced on them without departing from the spirit of the disclosure or from the scope of the appended claims. For example, elements and/or features of different illustrative and exemplary embodiments herein may be combined with each other and/or substituted for each other within the scope of this disclosure. As another example, two or more of the various components described herein may be combined into one or more consolidated components, or one of the various single components described herein may be provided as two or more sub-components.

What is claimed is:

1. A hermetic adapter comprising:
   an adapter body including a sealing element cavity, a dielectric cavity and a sealing ring cavity;
   a pin having an outside surface;
   a sealing element disposed between the outside surface of the pin and the sealing element cavity of the adapter body, the sealing element and the pin having substantially corresponding thermal expansion properties such that hermetic seals between the adapter body and the sealing element and between the sealing element and the pin are achievable;
   a dielectric disposed at least partially within the dielectric cavity of the adapter body, the dielectric including a contact cavity;
   a contact disposed at least partially within the contact cavity of the dielectric, the contact forming an electrical connection with the pin and having an attachment opposite the electrical connection with the pin for attaching to an external adapter;
   a sealing ring disposed at least partially within the sealing ring cavity of the adapter body such that a hermetic seal exists between the sealing ring and the adapter body; and
   a sharp edge configured to deform a surface of the external adapter to provide a hermetic seal between the external adapter and the hermetic adapter.

2. The hermetic adapter of claim 1, wherein the sealing ring is press fit into the sealing ring cavity of the adapter body.

3. The hermetic adapter of claim 1, wherein the contact and the dielectric mechanically engage one another.

4. The hermetic adapter of claim 1, wherein the contact includes a raised feature on an outer surface thereof configured to mechanically engage the dielectric.

5. The hermetic adapter of claim 1, wherein the contact includes a raised feature on an outer surface thereof configured to mechanically engage the contact cavity of the dielectric.

6. The hermetic adapter of claim 5, wherein the raised feature includes an angled surface.

7. The hermetic adapter of claim 1, wherein the contact includes a feature on an outer surface thereof configured to mechanically engage a surface of the dielectric that is substantially perpendicular to an axis of the contact.

8. The hermetic adapter of claim 1, wherein the contact includes at least two features on an outer surface thereof configured to mechanically engage respective surfaces of the dielectric that are substantially perpendicular to an axis of the contact.

9. The hermetic adapter of claim 1, wherein the sealing ring includes the sharp edge and the sharp edge is configured to deform a surface of the external adapter to provide a hermetic seal between the external adapter and the sealing ring.

10. A hermetically sealed cable assembly comprising:
    a cable;
    a first cable adapter attached to a first end of the cable;
    a second cable adapter attached to a second end of the cable;
    a first hermetic adapter according to claim 1 engaging the first cable adapter as an external adapter; and
    a second hermetic adapter according to claim 1 engaging the second cable adapter as an external adapter, wherein an interior of the cable is hermetically sealed between the first hermetic adapter and the second hermetic adapter.

* * * * *